United States Patent [19]
Warehime et al.

[11] Patent Number: 5,509,702
[45] Date of Patent: Apr. 23, 1996

[54] LOW DISTORTION PIPE COUPLING DEVICE

[75] Inventors: Kevin S. Warehime, Taneytown; Daniel T. Munley, Laurel, both of Md.

[73] Assignee: EG&G Pressure Science, Inc., Beltsville, Md.

[21] Appl. No.: 294,355

[22] Filed: Aug. 23, 1994

[51] Int. Cl.⁶ .................... B65D 63/02; F16L 17/06
[52] U.S. Cl. .................... 285/409; 285/410; 285/367; 285/411; 24/279
[58] Field of Search .................... 285/364, 365, 285/366, 367, 406, 407, 410, 411; 24/279–286

[56] References Cited

U.S. PATENT DOCUMENTS

| | | | |
|---|---|---|---|
| 167,262 | 8/1875 | Lewis | 24/285 |
| 196,807 | 11/1877 | Jolliffe et al. | 285/409 |
| 1,966,039 | 7/1934 | Muchnic | 285/411 |
| 2,673,102 | 3/1954 | Hutchinson | 285/409 |
| 2,689,141 | 9/1954 | Kiekhaefer | 285/410 |
| 2,706,648 | 4/1955 | Gosse | 285/409 |
| 2,744,706 | 5/1956 | Gerdy | 24/282 |
| 2,752,174 | 6/1956 | Frost | 285/409 |
| 3,181,901 | 5/1965 | Watts | 24/279 |
| 3,458,217 | 7/1969 | Pride, Jr. et al. | 285/410 |
| 3,544,138 | 12/1970 | Von Eiff | 285/367 |
| 3,575,432 | 4/1971 | Taylor | 277/206 R |
| 3,600,770 | 8/1971 | Hallins | 285/411 |
| 3,797,078 | 3/1974 | LaPointe | 285/367 |
| 3,797,079 | 3/1974 | Nixon | 285/411 |
| 4,123,095 | 10/1978 | Stehlin | 285/409 |
| 4,341,406 | 7/1982 | Abbes et al. | 285/408 |
| 4,739,542 | 4/1988 | Krzesicki | 285/367 |
| 4,919,453 | 4/1990 | Halling et al. | 285/3 |

FOREIGN PATENT DOCUMENTS

| | | | |
|---|---|---|---|
| 1403430 | 5/1965 | France . | |
| 319534 | 3/1920 | Germany | 285/129 |
| 1019322 | 2/1966 | United Kingdom | 285/367 |
| 1126872 | 9/1968 | United Kingdom . | |
| 1140636 | 1/1969 | United Kingdom . | |

OTHER PUBLICATIONS

"Assembly Instructions" for a pipe coupling, 1970's—Aeroquip.

*Primary Examiner*—Eric K. Nicholson
*Attorney, Agent, or Firm*—Roylance, Abrams, Berdo & Goodman

[57] ABSTRACT

A pipe coupling device for coupling the peripheral flanges of a pair of pipes together, including a pair of retainers with a V-shaped groove therein for receiving portions of the peripheral flanges of the pipes. The retainers are pivotally coupled at one of their ends by a hinge assembly and releasably coupled at their opposite ends by a latch mechanism. The hinge assembly has at least two links pivotally coupled at one of their ends to one of the retainers by a first pivot pin and pivotally coupled at their other ends to the other retainer by a second pivot pin. The pivot pins are separated from each other such that the links of the hinge assembly straddle the peripheral flanges of the pipes. This arrangement provides more uniform pressure at the ends of the retainers since the moment resulting from the offset of the hinge assembly is moved closer to the circumferential loading line between the retainers and the flanges of the pipe. In a second embodiment, the retainers are pivotally coupled together at one of their ends by a single pivot pin and releasably coupled together at their other end by a canted latch mechanism.

28 Claims, 6 Drawing Sheets

5,509,702

LOW DISTORTION PIPE COUPLING DEVICE

FIELD OF THE INVENTION

The invention relates to a low distortion pipe coupling device for coupling the end flange of one pipe to the end flange of another pipe. More specifically, the invention relates to a pipe coupling device having two arcuate retaining members or retainers which are coupled together at one end by a hinge and at the other end by a latch.

BACKGROUND OF THE INVENTION

Circular, V-couplings for clamping the peripheral end flanges of pipes together have been used for many years, especially in pipes conducting high temperature and pressure fluids. Currently there are many types of V-couplings available for connecting the peripheral end flanges of pipes. One of the more common type coupling is fabricated from sheet metal retainers attached to tension bands. Two examples of these types of pipe couplings are disclosed in U.S. Pat. No. 3,600,770 to Halling and U.S. Pat. No. 4,341,406 to Abbes et al. At first these types of pipe couplings were in widespread use in the aircraft and aerospace industries; however, their reliability was very questionable, owing to failures of their riveted or spot welded joints and fatigue failures of their tension bands.

Another common type of V-coupling was later introduced, using forged, cast or machined retainers, with integrally hinged ends joined by eyebolt fasteners and connecting links. While the "forged-style" couplings have proven extremely reliable and efficient, they suffer from one main disadvantage, which is addressed by the present invention.

Specifically, current "forged-style" couplings use tension-type swing-bolts and connecting links that are disposed at a considerable offset distance from the neutral axis of the coupling retainer channel section. The resultant movement produced by the fastener tightening torque causes inward rotation of the retainer ends which, in turn, locally deflects the flanges of the pipes inward. Opposite the fastener, the two retainers are joined by one or more non-adjustable links, which are offset from the circumferential loading line between the two retainers. This offset arrangement in this type of coupling is essential to the proper functioning of the coupling so that tension is transmitted through the linked retainer ends entirely symmetrically. Accordingly, the same amount of inward deflection occurring at the fastener ends of the retaining member is also produced at the hinged ends of the retaining member.

These problems have led to the development of numerous other types of V-pipe coupling. However, many of these new designs are difficult to manufacture. Moreover, these new designs are often more expensive and complicated to use. One example of a relatively new design is disclosed in U.S. Pat. No. 4,919,453 to Halling et al. While this V-coupling performs quite well, the latch mechanism is more expensive than more conventional latch mechanisms.

Examples of some prior couplings are disclosed in U.S. Pat. No. 1,966,039 to Muchnic; U.S. Pat. No. 3,575,432 to Taylor; and U.S. Pat. No. 3,797,836 to Halling; French Pat. No. 1,403,430 to Avia Equipment Ltd.; and British Pat. Nos. 1,126,872 to Ward et al; and 1,140,636 to Brownhill et al.

In view of the above, it will be apparent to those skilled in the art that there exists a need for a pipe coupling device that reduces distortion of the pipes, and that improves manufacturability of pipe coupling devices. This invention addresses the above needs as well as other needs which will become apparent to those skilled in the art once given this disclosure.

SUMMARY OF THE INVENTION

Accordingly, a primary object of the present invention is to provide a pipe coupling device with less pipe distortion.

Another object of the invention is to provide a V-coupling that is relatively easy to assemble, reliable, and relatively simple to make.

Another object of the invention is to provide a V-coupling that reduces the amount of offset in the circumferential loading line of the latch and the hinge.

Another object of the invention is to provide a V-coupling that limits the amount of loosening of the retaining members around the pipe should a primary link fail.

The foregoing objects are basically attained by providing a pipe coupling device for releasably coupling a pair of pipes with peripheral end flanges together, comprising: a first arcuate retainer having a first end, a second end, and a groove with an inner gripping surface extending between the first and second ends for receiving a portion of each of the peripheral end flanges of the pipes therein; a second arcuate retainer having a first end, a second end, and a groove with an inner gripping surface extending between the first and second ends of the second arcuate retainer for receiving a portion of each of the peripheral end flanges of the pipes therein; a hinge including a first link and a second link with each of said links being pivotally coupled to the retainers adjacent the first ends of the retainers by first and second pivot pins respectively, the links each having a line of force extending between the centers of the pins, and the first link being positioned on one side of the peripheral flanges of the pipes and the second link being positioned on the other side of the peripheral flanges of the pipes to straddle the peripheral flanges of the pipes; and a latch pivotally coupled the second end of the first retainer and releasably coupled to the second end of the second retainer.

In the preferred embodiments of the invention, the pipe coupling device has center lines of the links as close as possible to the area of greatest concentration of the forces applied to the peripheral flanges of the pipes by the coupling device, i.e., the circumferential loading line. Of course, it is not necessarily possible in all circumstances for center lines of the links to coincide with the circumferential loading line since the links would interfere with the pipes in some cases. Thus, the transverse width of the links limits the ability to have center lines of the links coinciding with the circumferential loading line. Moreover, in some circumstance where cost is a major factor, conventional links may be used instead of manufacturing special links which would optimize performance of the coupling.

The foregoing objects are also attained by a pipe coupling device for releasably coupling a pair of pipes with peripheral end flanges together, comprising: a first arcuate retainer having a first end with a first pivot point adjacent thereto, a second end with a retaining surface adjacent thereto, and a groove with an inner gripping surface extending between the first and second ends for receiving a first portion of each of the peripheral end flanges of the pipes therein; a second arcuate retainer having a first end with a second pivot point adjacent thereto, a second end with a third pivot point adjacent thereto, and a groove with an inner gripping surface extending between the first and second ends of the second arcuate retainer for receiving a second portion of each of the peripheral end flanges of the pipes therein; a hinge pivotally coupling the first ends of the first and second retainers; and a latch having one end pivotally coupled to the third pivot point at the second end of the second retainer and its other end releasably engaging the retaining surface at the second end of the first retainer, the latch having a coupling load line of force extending between the third pivot point and the retaining surface with the coupling load line being substantially tangent to a point on the first retainer and diverging from the second retainer.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings which form part of this original disclosure.

DETAILED DESCRIPTION OF THE INVENTION

Figure 1:
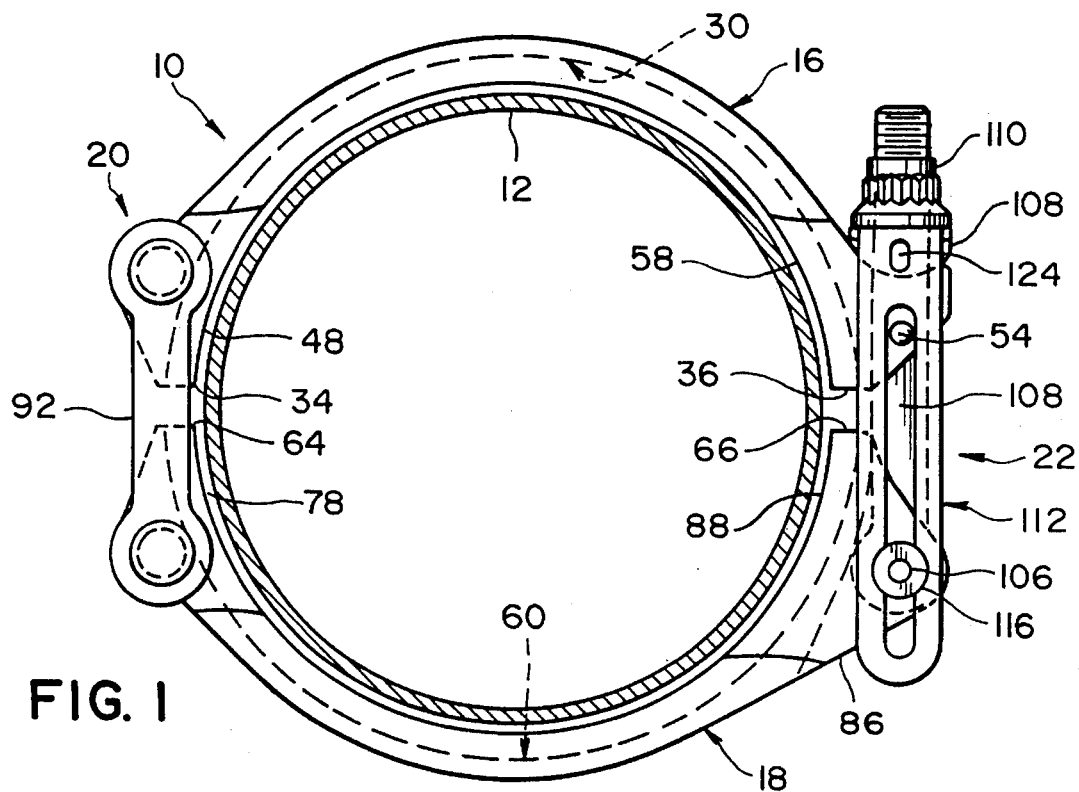
FIG. 1 is a side elevational view of a pipe coupling device in accordance with a first embodiment of the present invention coupled about the peripheral flanges of a pair of coaxial pipes.
Figures 2, 3:
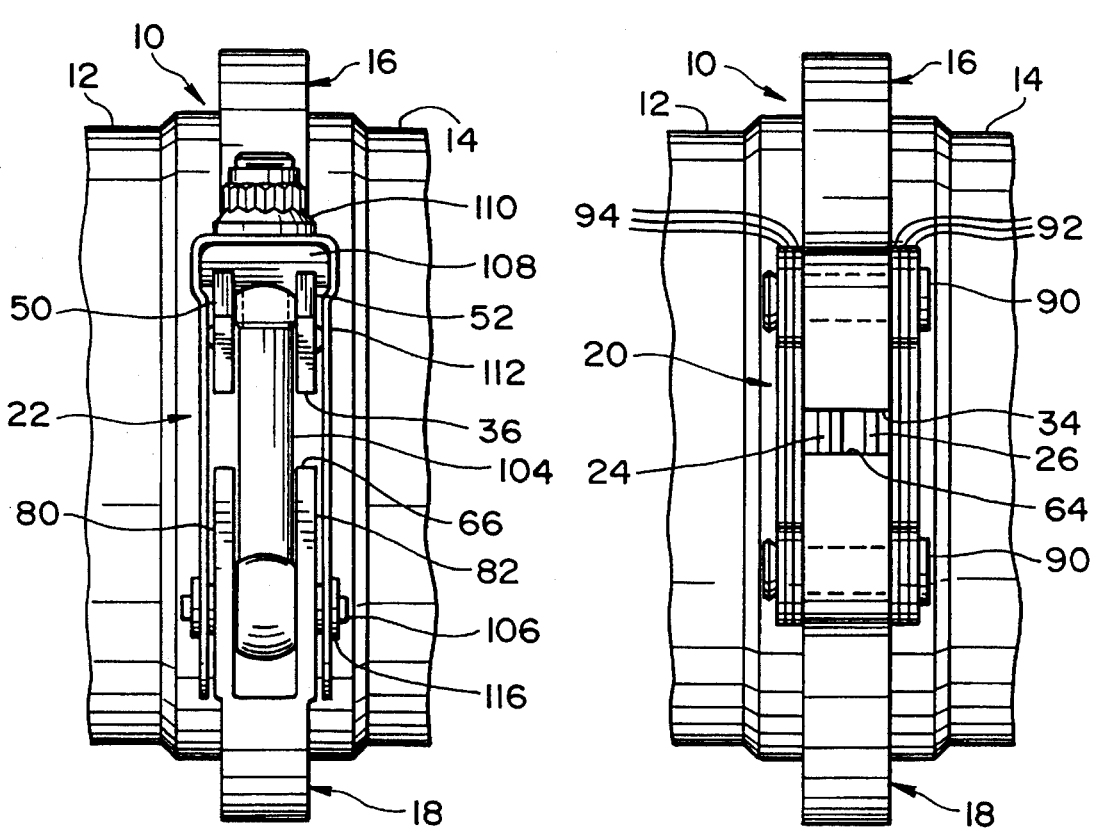
FIG. 2 is a front end elevational view of the pipe coupling device of FIG. 1 illustrating the latch mechanism coupled about the peripheral flanges of the pipes prior to fully tightening of the latch mechanism.
FIG. 3 is a rear end elevational view of the pipe coupling device of FIGS. 1 and 2 illustrating the hinge assembly coupled about the peripheral flanges of the pipes.

Referring initially to FIGS. 1–3, a pipe V-coupling device 10 in accordance with a first embodiment of the present invention is illustrated for connecting and coupling first and second coaxial pipes 12 and 14 together. Pipe coupling 10 device includes a first or upper retainer 16 for engaging first portions of the peripheral flanges of pipes 12 and 14, a second or lower retainer 18 for engaging second portions of the peripheral flanges of pipes 12 and 14, a hinge assembly 20 for coupling one of the ends of retainers 16 and 18 together, and a latch mechanism 22 for releasably coupling the other ends of retainers 16 and 18 together.

Pipe coupling device 10 is designed to decrease distortion of the pipes 12 and 14 or any other component coupled to pipes 12 and 14 from the moments produced by hinge assembly 20 and latch mechanism 22. Specifically, hinge assembly 20 and latch mechanism 22 in accordance with the present invention are designed to reduce the amount of offset of their moments from the circumferential loading line of the retainers 16 and 18 to minimize distortion of the pipes 12 and 14. In other words, the resultant moments produced by hinge assembly 20 and latch mechanism 22 are closer to the coupling force (circumferential loading line) of retainers 16 and 18 on the pipes 12 and 14. This arrangement minimizes the inward rotation of the ends of retainers 16 and 18, i.e., reduces local deflection of the pipes 12 and 14 by the ends of retainers 16 and 18.

Pipes 12 and 14 are conventional pipes, tubes or conduits which have peripheral end flanges 24 and 26, respectively, which are engaged by retainers 16 and 18 for coupling pipes 12 and 14 together. In particular, flanges 24 and 26 are tapered so that upon tightening retainers 16 and 18 about flanges 24 and 26, the flanges 24 and 26 are forced together. An E-shaped seal 28 is positioned between peripheral flanges 24 and 26 of pipes 12 and 14 for sealing the connection therebetween.

Figure 4:
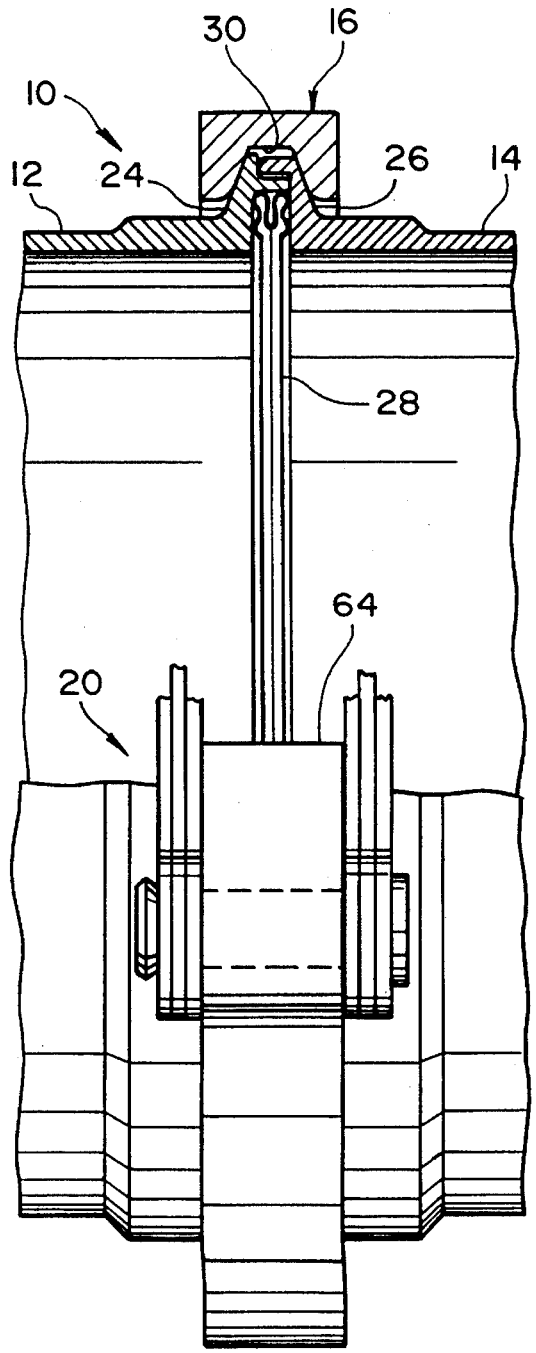
FIG. 4 is a partial, enlarged longitudinal sectional view of the pipe coupling device taken along section line 4—4 of FIG. 1 illustrating the retainers engaging the peripheral flanges of the pipes.
Figure 8:
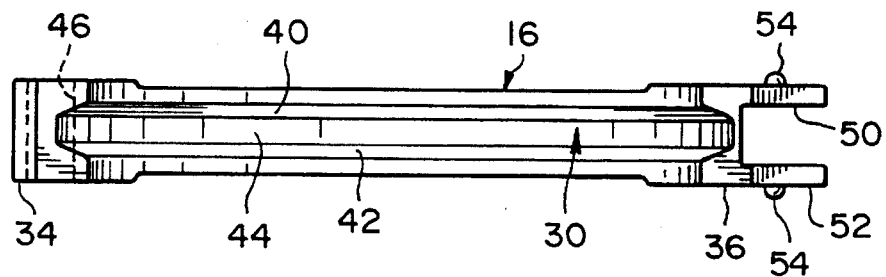
FIG. 8 is a bottom plan view of the upper retainer of the coupling device illustrated in FIGS. 1–7.
Figure 9:
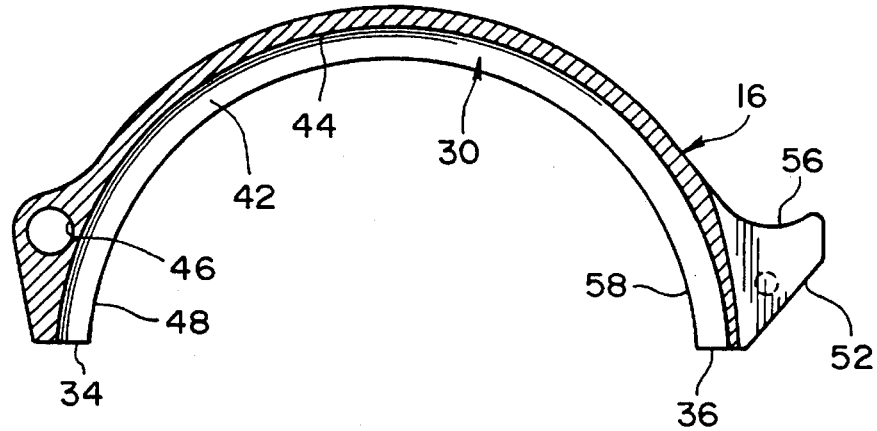
FIG. 9 is a transverse cross-sectional view of the upper retainer of the pipe coupling device of FIG. 8 taken along section line 9—9.
Figure 10:
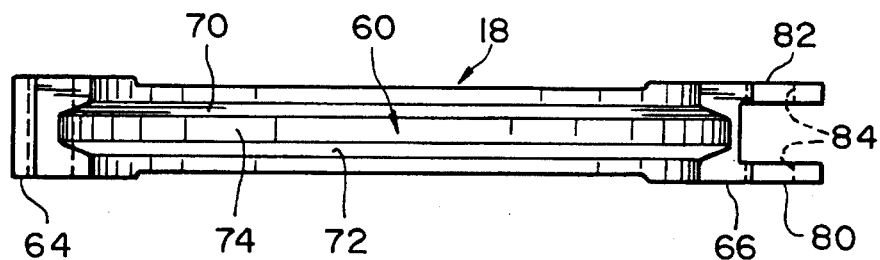
FIG. 10 is a top plan view of the lower retainer of the coupling device illustrated in FIGS. 1–7.
Figure 11:
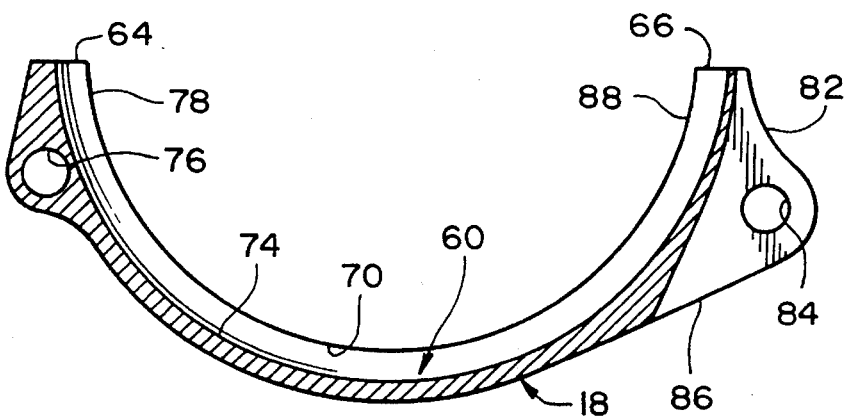
FIG. 11 is a transverse cross-sectional view of the second retainer of the pipe coupling device of FIG. 10 taken along section line 11—11.

Referring now to FIGS. 4, 8 and 9, first retainer 16 is an arcuate retaining member having a v-shaped groove 30 extending from a first end 34 of retainer 16 to a second end 36 of retainer 16. Groove 30 has an inner V-shaped gripping surface formed by a pair of slanted surfaces 40 and 42 for engaging end flanges 24 and 26 of pipes 12 and 14 and a connecting surface 44 extending between slanted surface 40 and slanted surface 42. Upon tightening latch mechanism 22 slanted surfaces 40 and 42 engage the tapered peripheral end flanges 24 and 26 of pipes 12 and 14 to securely couple pipes 12 and 14 together.

Preferably, the arc extending between first end 34 and second end 36 of retainer 16 is approximately 180°. Retainer 16 is preferably a one-piece, unitary member constructed out of a suitable metallic material typically used in the coupling art such as stainless steel. Second end 36 of retainer 16 is thinned down along connecting surface 44 so that latch mechanism 22 can be moved as close as possible to the circumferential loading line of the retainer 16. This reduces the moment produced by latch mechanism 22 on the second end 36 of retainer 16 to lower or eliminate any distortion on pipes 12 and 14.

A pivot hole 46 is formed on first retainer 16 adjacent first end 34 for pivotally attaching one end of hinge assembly 20 thereto. Pivot hole 46 is spaced from first end 34 about the circumference of retainer 16 to form a lever arm 48 therebetween to counteract the inward force resulting from hinge assembly 20 on retainer 16. In other words, the moment resulting from hinge assembly 20 produces an inwardly directed force which is greatest at pivot hole 46 of retainer 16. This inwardly directed force is transmitted to lever arm 48 of retainer 16 so that the inwardly directed force of the moment is spread out from the point at pivot hole 46 along lever arm 48. This results in a more even distribution of the moment produced by hinge assembly 20 along retainer 16. Pivot hole 46 is also formed as close as possible to connecting surface 44 of groove 30 so that hinge assembly 20 straddles flanges 24 and 26 of pipes 12 and 14 as discussed below.

A pair of gusset plates 50 and 52 are formed on retainer 16 adjacent its second end 36. Each of gusset plates 50 and 52 has a half spherical protrusion 54 and a curved rear saddle surface or retaining surface 56. Half spherical protrusions 54 and curved retaining surfaces 56 engage parts of latch mechanism 22 to releasably retain latch mechanism 22 on gusset plates 50 and 52 as discussed below.

As previously mentioned, the portion of retainer 16 between pivot hole 46 and first end 34 acts as lever arm 48 for engaging flanges 24 and 26 of pipes 12 and 14 to more uniformly distribute the load resulting from the moment induced rotation of retainer 16 by hinge assembly 20. Similarly, the portion of retainer 16 between second end 36 and curved surfaces 56 of gusset plates 50 and 52 also acts as a lever arm 58 to better distribute the inward loads resulting from the moment induced rotation of retainer end 36 by latch mechanism 22. This reduction of the inward loads at the ends 34 and 36 of the retainer 16 decreases the distortion of the flanges 24 and 26 of pipes 12 and 14. Accordingly, coupling device 10 can be tightened with a higher torque to apply a higher circumferential coupling force on the flanges 24 and 26 of pipes 12 and 14 without distortion thereof.

Second retainer 18 is similar to retainer 16, and includes a V-shaped groove 60 extending between a first end 64 and a second end 66. Groove 60 has an inner V-shaped gripping surface with a pair of slanted surfaces 70 and 72 and a connecting surface 74 extending between slanted surfaces 70 and 72. Like retainer 16, retainer 18 is preferably a one-piece, unitary member constructed of a suitable metallic material typically used in the pipe coupling field in which pipe coupling device will be used. One such material for retainer 18 is stainless steel.

Preferably, the arc extending between first end 64 and second end 66 of retainer 18 is approximately 180°. Second end 66 of retainer 18 is thinned down along connecting surface 74 so that latch mechanism 22 can be moved as close as possible to the circumferential loading line of the retainer 18. This reduces the moment produced by latch mechanism 22 on the second end 66 of retainer 18 to lower or eliminate any distortion on pipes 12 and 14.

A pivot hole 76 is positioned adjacent to first end 64 of retainer 18, but spaced therefrom to form a lever arm 78 therebetween to counteract the inward force resulting from the moment produced by hinge assembly 20 on retainer 18. In other words, the moment produced by hinge assembly 20 produces an inwardly directed force which is greatest at pivot hole 76 of retainer 18. This inwardly directed force is transmitted to lever arm 78 of retainer 18 so that the inwardly directed force of the moment is spread out from the point at pivot hole 76 along lever arm 78. This results in a more even distribution of the moment produced by hinge assembly 20 along retainer 18. Pivot hole 76 is positioned as close as possible to connecting surface 74 of groove 60 to lower the moment resulting from hinge assembly 20 on the first end 64 of retainer 18. Pivot hole 76 pivotally couples one end of hinge assembly 20 thereto as discussed below.

A pair of gusset plates are formed at second end 66 of second retainer 18 for coupling one end of latch mechanism 22 thereto. Gusset plates 80 and 82 each have a pivot hole 84 which is spaced from second end 66 of retainer 18 to form a lever arm 88. Gusset plates 80 and 82 extend from second end 66 about the circumference of first retainer 18 so that rear edges 86 of gusset plates 80 and 82 extend tangentially from retainer 18. Accordingly, gusset plates 80 and 82 are larger than conventional gusset plates for additional strength without increasing the overall dimensions of coupling device 10.

As previously mentioned, the portion of retainer 18 between pivot hole 76 and first end 64 acts as lever arm 78 for engaging flanges 24 and 26 of pipes 12 and 14 to more uniformly distribute the load resulting from the moment induced rotation of retainer 18 by hinge assembly 20. Similarly, the portion of retainer 18 between second end 66 and pivot holes 84 of gusset plates 80 and 82 also acts as a lever arm 88 to better distribute the inward loads resulting from the moment induced rotation of retainer end 66 by latch mechanism 22. This reduction of the inward loads at the ends 64 and 66 of the retainer 18 decreases the distortion of the flanges 24 and 26 of pipes 12 and 14. Accordingly, coupling device 10 can be tightened with a higher torque to apply a higher circumferential coupling force on the flanges 24 and 26 of pipes 12 and 14 without distortion thereof.

By minimizing the distance between first ends 34 and 64 and the distance between second ends 36 and 66, coupling device provides a more complete and uniform pressure about the circumference of peripheral end flanges 24 and 26 of pipes 12 and 14. Of course, there should be some space between first ends 34 and 64 and between second end 36 and 66 so that coupling device 10 can be fully tightened without bottoming out.

Hinge assembly 20 includes a pair of pivot pins 90, a first set of three links 92 and a second set of three links 94. Pivot pins 90 are in the form of rivets which are deformed at one end for securing links 92 and 94 to retainers 16 and 18. Specifically, links 92 each have a pivot hole 96 at one end for receiving one of the pivot pins 90 therein and a second pivot hole 98 at its other end for receiving the other of the pivot pin 90 therein. Likewise, links 94 have a pivot hole 100 at one end for coupling to first retainer 16 and a second pivot hole 102 at its other end for coupling to retainer 18.

Figure 5:
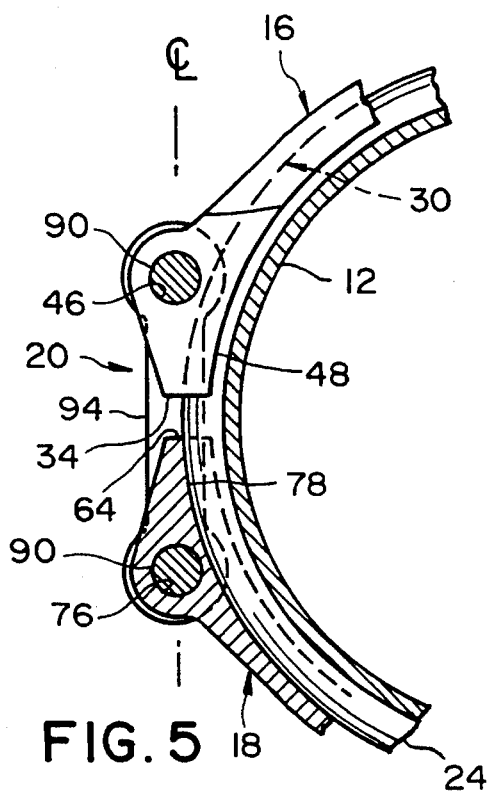
FIG. 5 is a partial, side elevational view of the pipe coupling device of FIGS. 1–4 with portions broken away for purposes of illustrating the relationship of the hinge assembly to the peripheral flanges of the pipes.

Pivot pins 90 are positioned on retainers 16 and 18 so that the distance between pivot pins 90 and its respective first end 34 or 64 is greater than the distance between first ends 34 and 64 of retainers 16 and 18 as seen in FIGS. 1 and 5. This arrangement provides for lever arms 48 and 78 having lengths which significantly decrease the amount of distortion on pipes 12 and 14. Likewise, the distance between curved surfaces 56 and second end 36 of retainer 16 defining lever arm 58 is a greater than the distance between second ends 36 and 66 of retainers 16 and 18, and the distance between pivot holes 84 and second end 66 of retainer 18 defining lever arm 88, is greater than the distance between second ends 36 and 66 of retainers 16 and 18. Thus, lever arms 58 and 88 have lengths which significantly decrease the amount of distortion on pipes 12 and 14.

Figure 7:
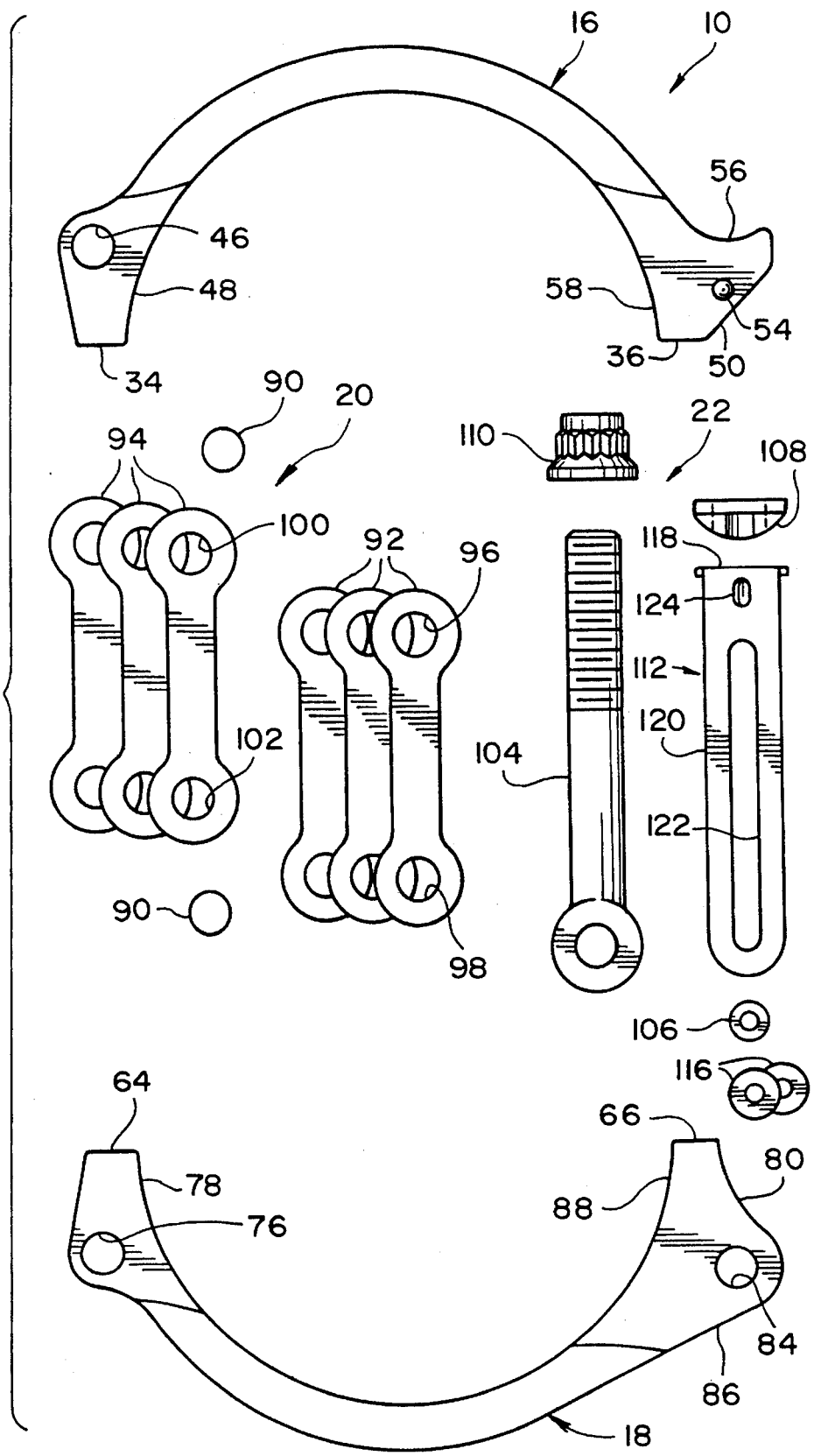
FIG. 7 is an exploded, side elevational view of the pipe coupling device of FIGS. 1–6.

As seen in the FIGS. 5 and 7, links 92 and 94 are dog bone shaped links constructed of any suitable metal used in the pipe coupling field in which the pipe coupling device will be used. One such material for links 92 and 94 is stainless steel. It will be apparent to those skilled in the art from this disclosure, that links 92 can have more or less links depending upon the size of the links needed and/or desired. Similarly, links 94, can also have more or less links depending upon the size of the links needed and/or desired. Accordingly, two thick links may be used or any number of thin links.

Links 92 and 94 straddle peripheral flanges 24 and 26 of pipes 12 and 14 so that the moment produced by links 92 and 94 is moved inwardly towards the circumferential loading line of the retainers 16 and 18. In other words, the center line passing through the center of pivot pins 90 is moved inwardly towards peripheral flanges 24 and 26 of pipes 12 and 14 to reduce the bending moment induced on the first ends 34 and 64 of retainers 16 and 18. Ideally, this center line of links 92 and 94 should be moved in as close as possible to the circumferential loading line of the retainers 16 and 18 as practical based on the needed transverse width of the links 92 and 94. Stated differently, the links 92 and 94 are moved in as close as possible to pipes 12 and 14 without actually engaging pipes 12 and 14. Of course, the practical limit to this inward movement of the center line of links 92 and 94 is limited by the transverse width of the dog bone links 92 and 94 at their center points. As seen in FIG. 5, hinge assembly 20 is arranged so that the inner edges (only one shown) are substantially tangent to the outer circumferential edges of flanges 24 and 26 of pipes 12 and 14.

In order to reduce costs, conventional sized dog bone links 92 and 94 are preferably used. Accordingly, if cost is a major factor in designing the coupling device 10, the designer should select conventionally available dog bone links 92 and 94 which (1) move the center line of links 92 and 94 as close as possible to the circumferential loading line of the retainers 16 and 18, and (2) position the pivot holes 46 and 76 a selected distance from first ends 34 and 64, respectively, to produce a pair of lever arms 48 and 78 for distributing the inwardly direct force produced by the moment of hinge assembly 20. Of course, as larger diameter pipes are being coupled together by pipe coupling device 10, the dog bone links 92 and 94 will become longer and wider. For example, dog bone links 92 and 94 suitable for the subject coupling device 10 are currently available in sizes ranging from 0.550 inch to 1.400 inch center to center or from 1.080 inch to 1.930 inch in overall length. Thus, to obtain the optimum geometry for pipe diameters over 2.00 inches the most suitable conventional dog bone link has a center to center length of 1,400 inch.

It will also become apparent to those skilled in the art from this disclosure that in large diameter pipes, the "nutcracker" effect from the moment of the hinge assembly 20 is lessened than for small diameter pipes. Thus, when diameter of the pipes 12 and 14 is large, it is less important to obtain the center line of the links as close as possible to the circumferential loading line.

Figure 6:
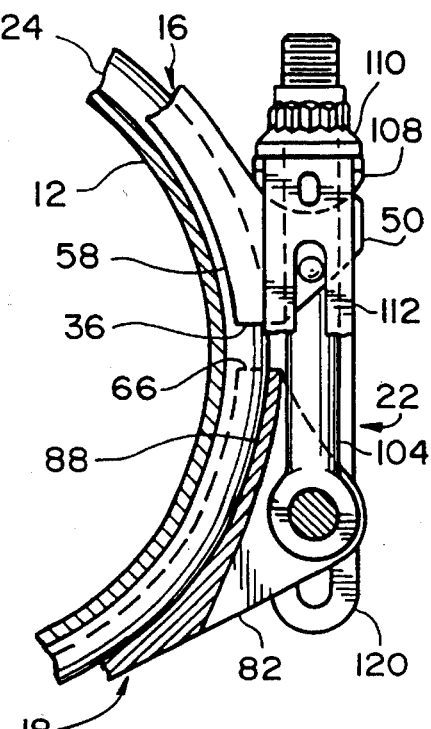
FIG. 6 is a partial, side elevational view of the pipe coupling device of FIGS. 1–5 with portions broken away for purposes of illustrating the relationship of the latch mechanism to the peripheral flanges of the pipes.

As seen in FIGS. 6 and 7, latch mechanism 22 is coupled to second ends 36 and 66 of retainers 16 and 18, and includes a tension bolt 104, a pivot pin 106 for coupling tension bolt 104 to second end 66 of first retainer 18, a saddle washer 108 for engaging curved surfaces 56 of retainer 16, a self-locking nut 110 for releasably securing and tightening retainers 16 and 18 about peripheral flanges 24 and 26 of pipes 12 and 14,, and a fail safe link 112 for retaining coupling device 10 about pipes 12 and 14 upon failure of bolt 104.

The basic construction of latch mechanism 22 is described in U.S. Pat. No. 3,600,770 to Horace P. Halling which is hereby incorporated herein by reference. Thus, the construction of latch mechanism 22 will not be illustrated or discussed in detail herein.

In this embodiment, tension bolt 104 is substantially parallel to links 92 and 94 when securely coupled about peripheral end flanges 24 and 26 of pipes 12 and 14. Tension bolt 104 is pivotally coupled by pivot pin 114 to retainer 18. In particular, pivot pin 114 is rotatably received in pivot holes 84 of retainer 18 and has a pair of washers 116 positioned on its ends which are in turn crimped for pivotally securing tension bolt 104 to second retainer 18.

The saddle washer 108 has a curved surface on one side for engaging the curved lug surfaces 56 of gusset plates 50 and 52, and a flat side for engaging safety link 112. Saddle washer 108 has a center bore (not shown) for slidably receiving the shaft of the tension bolt 104 therein. The sides of saddle washer 108 has curved grooves for coupling saddle washer 108 to safety link 112.

Safety link 112 is substantially U-shaped having a bight portion 118 with a hole (not shown) for slidably receiving the shaft of tension bolt 104 therethrough, and a pair of legs 120 with elongated slots 122 for slidably receiving the ends of pivot pin 114 therein and for receiving half spherical protrusions 54 therein via a snap fit. Each of the legs 120 of safety link 112 has an indented portion 124 adjacent bight portion 118 so as to engage curved grooves 17 of saddle washer 108. Accordingly, safety link 112 holds saddle washer 108 from moving along the shaft of bolt 104.

In operation, first and second retaining members 16 and 18 are placed about the butting peripheral end flanges 24 and 26 of pipes 12 and 14 so that a portion of the peripheral flanges 26 and 28 are received in the grooves 30 and 60 of retainers 16 and 18. In this position, links 92 are positioned on one side of peripheral flanges 24 and 26 and links 94 are positioned on the other side of peripheral flanges 24 and 26 to straddle peripheral flanges 24 and 26.

Next, tension bolt 104 together with saddle washer 108 and safety link 112 are pivoted so that the curved surface of saddle washer 108 lies in the concaved curve surfaces 56 of the gusset plates 50 and 52 of first retainer 16. Now, nut 110 is threaded onto the end of tension bolt 104 so as to tighten the retainers 16 and 18 about peripheral flanges 24 and 26 of pipes 12 and 14. Pipe coupling device 10 is designed so that the distance between first ends 34 and 64 of retainers 16 and 18 is substantially equal to the distance between the second ends 36 and 66 of retainers 16 and 18 when properly tightened about pipes 12 and 14.

Removal of pipe coupling device 10 from pipes 12 and 14, is easily accomplished by carrying out the various steps described hereinbefore in the reverse order.

Second Embodiment

Figure 12:
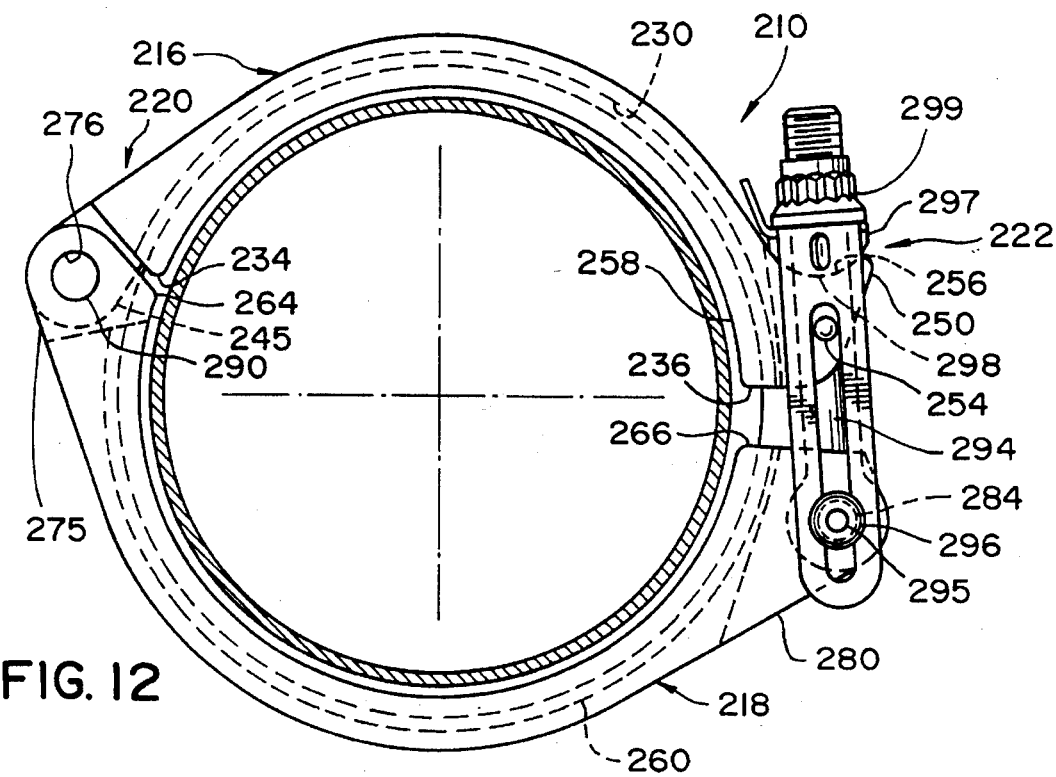
FIG. 12 is a side elevational view of a pipe coupling device in accordance with a second embodiment of the present invention coupled about peripheral flanges of a pair of pipes.
Figure 13:
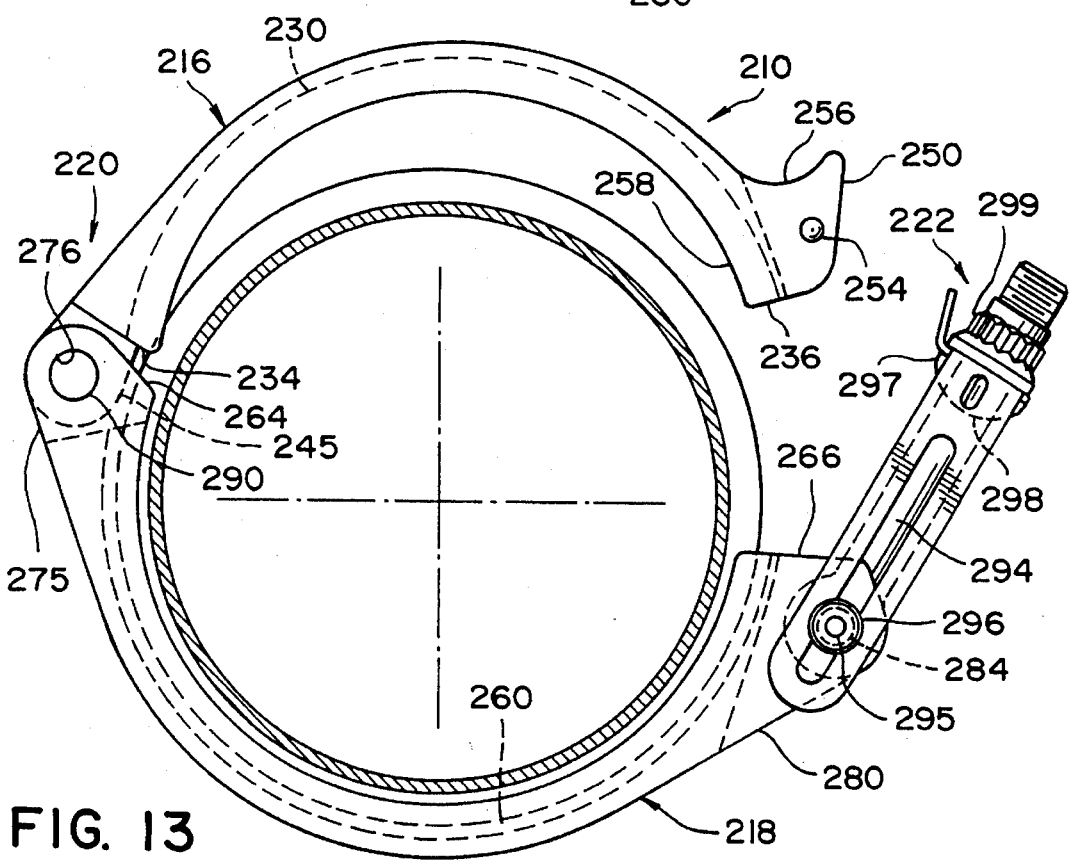
FIG. 13 is a side elevational view of the pipe coupling device of FIG. 12 partially installed on the pipes.
Figure 14:
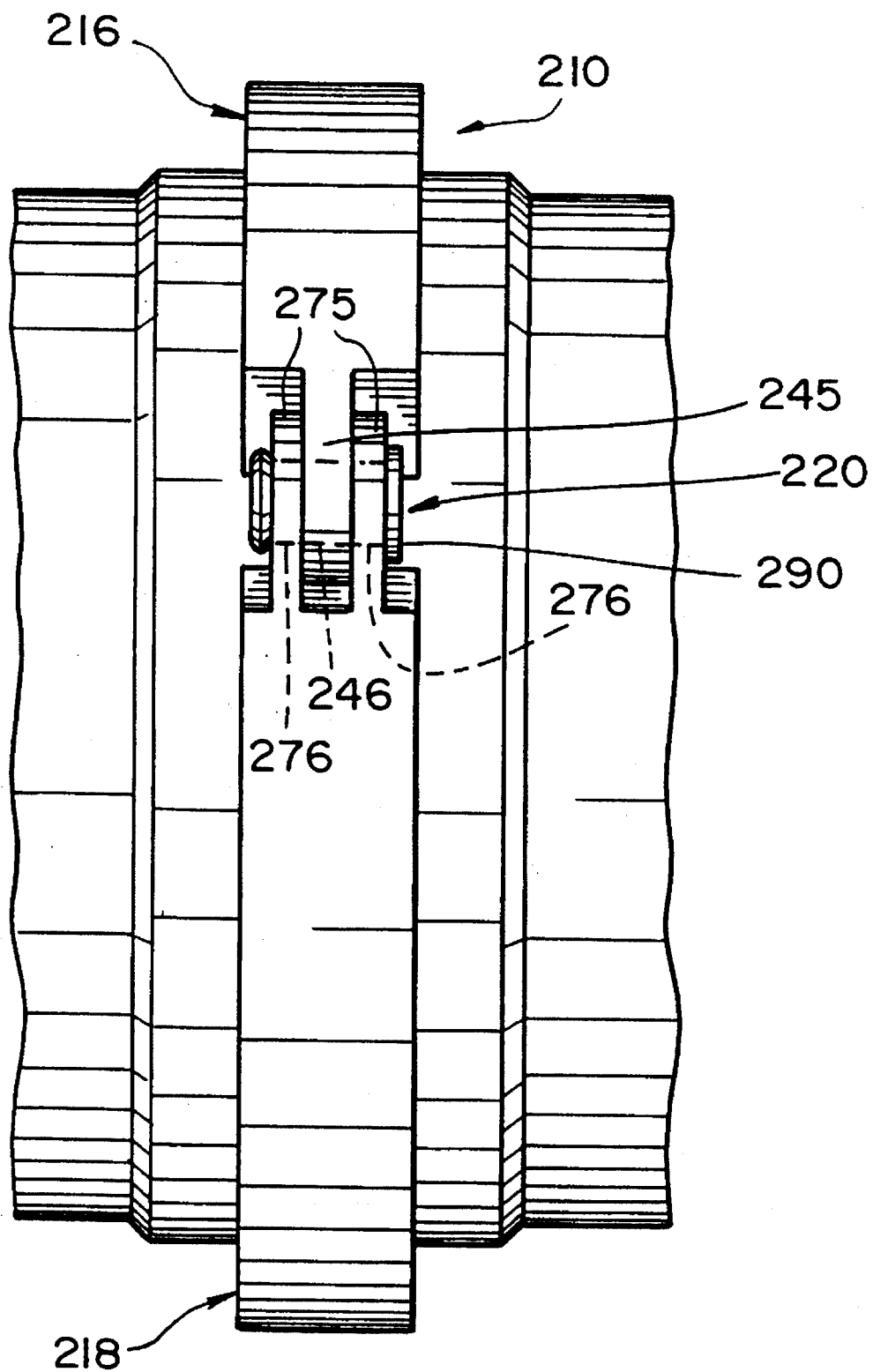
FIG. 14 is a rear end elevational view of the pipe coupling device of FIGS. 12 and 13 illustrating the hinge.

Referring now to FIGS. 12–14, a pipe coupling device 210 in accordance with a second embodiment of the present invention is illustrated, and includes a first retainer 216, a second retainer 218, a single pivot hinge 220 for pivotally coupling one end of each of the retainers 216 and 218 together, and a latching mechanism 222 for releasably coupling the other ends of retainers 216 and 218 together. This embodiment is similar to the first embodiment, except that the ends of retainers 216 and 218 have been modified to accommodate a single pivot hinge 220 and the canting or angling of latching mechanism 222 has been modified. Accordingly, this embodiment will not be illustrated or discussed in detail herein.

First retainer 216 is an arcuate retaining member having a V-shaped groove 230 extending from a first end 234 of retainer 216 to a second end 236 of retainer 216. Preferably, the arc extending between first end 234 and second end 236 of retainers 216 can be in the range of approximately 150° to approximately 160°. Retainer 216 is preferably a one-piece, unitary member constructed out of a suitable metallic material typically used in the coupling art, such as stainless steel. First end 234 of first retainer 216 has an outwardly extending flange 245 with a pivot hole 246 formed therein. Flange 245 with pivot hole 246 forms part of hinge 220 as discussed below.

Second end 236 of first retainer 216 has a pair of spaced gusset plates 250 (only one shown) formed thereon for releasably coupling latching mechanism 222 thereto. Each of the gusset plates 250 has a half spherical protrusion 254, and a curved rear saddle surface or retaining surface 256 for engaging parts of latch mechanism 222 to releasably retain latch mechanism 222 on gusset plates 250.

Retaining surface 256 is spaced further from second end 236 of first retainer 216 to form a lever arm 258. Preferably, retaining surface 256 is positioned approximately 15° to 20° from a center line passing through the center of the pipes and midway between the second ends 236 and 266 of retainers 216 and 218. The length of the lever arm 258 is designed to better distribute the inward loads resulting from the moment induced rotation of second end 236 of retainer 216 by latch mechanism 222. This reduction of the inward load at second end 236 of retainer 216 by lever arm 258 substantially eliminates any distortion of the pipes. Accordingly, coupling device 210 can be tightened with a higher torque to apply a higher circumferential coupling force on the flanges of the pipe without distortion thereof.

Second retainer 218 is similar to retainer 216, and includes a V-shaped groove 260 extending between a first end 264 and a second end 266. Like retainer 216, retainer 218 is preferably a one-piece, unitary member constructed of a suitable metallic material typically used in the pipe coupling field in which the pipe coupling device will be used. One such material for retainer 218 is stainless steel. Preferably, the arc extending between first end 264 and second end 266 of retainer 218 ranges from approximately 200° to approximately 210°. Accordingly, retainer 216 and retainer 218 engage the peripheral flanges of the pipes by an arc extending from about 350° to about 355°.

First end 264 of retainer 218 has a pair of flanges 275 with pivot holes 276 formed therein for pivotally coupling to first end 234 of retainer 216 thereto. Flanges 275 with pivot holes 276 form part of hinge 220 as discussed below.

Second end 266 of retainer 218 includes a pair of spaced gusset plates 280 (only one shown) for pivotally coupling one end of latch mechanism 222 thereto. Gusset plates 280 each have a pivot hole 284. Gusset plates 280 differ from gusset plates 80 and 82 of the first embodiment in that the pivot holes 284 are spaced closer to the second end 266 of retainer 218 and spaced farther away from the circumferential loading line of retainer 218. This placement of pivot holes 284 causes the forces acting on second end 266 produced by the moments of hinge 220 to straighten out second end 266 of retainer 218 rather than causing an inward deflection of second end 266 of retainer 218.

Hinge 220 is a clevis hinge arranged in double shear, and includes flange 245 of retainer 216, flanges 275 of retainer 218, and a pivot pin 290 which is received in pivot holes 246 and 276 for pivotally coupling first retainer 216 to second retainer 218 about a single pivot point. Preferably, the center of pivot pin 290 is offset from the center line of the pipe which extends through the center of the pipe and midway between the second ends 236 and 266 of retainers 216 and 218, respectively, by an angle of approximately 16°.

Latch mechanism 222 is substantially identical in construction to latch mechanism 22 discussed above. Accordingly, latch mechanism 222 will not be discussed in detail herein. Basically, latch mechanism 222 includes a tension bolt 294, a pivot pin 295 rotatably received in pivot holes 284 of retainer 218, a pair of washers 296 positioned on the ends of pivot pin 295, a saddle washer 297 with a curved surface 298 for engaging retaining surface 256 of retainer 216, and a self-locking nut 299.

When coupling device 210 is secured about the peripheral flanges of the pipes and latch mechanism 222 is fully tightened, the coupling line of force of latch mechanism 222 extending through the center of tension bolt 294 is substantially parallel to a tangent line extending through a point on retainer 216 and diverges from second retainer 218. This coupling force, as previously mentioned, produces a moment on retainers 216 and 218. The moment of latch mechanism 222 tends to deflect second end 236 of first retainer 216 inwardly, while on the other hand, tends to straighten out the second end 266 of retainer 218.

While only two embodiments have been chosen to illustrate the invention, it will be understood by those skilled in the art that various changes and modifications can be made herein without departing from the scope of the invention as defined in the appended claims.

What is claimed is:

1. A pipe coupling device for releasably coupling a pair of pipes with peripheral end flanges together, comprising:

a first arcuate retainer having a first end, a second end, and a groove with an inner gripping surface extending between said first and second ends for receiving a first portion of each of the peripheral end flanges of the pipes therein;

a second arcuate retainer having a first end, a second end, and a groove with an inner gripping surface extending between said first and second ends of said second arcuate retainer for receiving a second portion of each of the peripheral end flanges of the pipes therein;

a hinge including a first link and a second link with each of said links being pivotally coupled to said retainers adjacent said first ends of said retainers by first and second pivot pins, respectively, each of said links having a line of force extending between said centers of said pins, and said first link being positioned on one side of the peripheral flanges of the pipes and said second link being positioned on the other side of the peripheral flanges of the pipes to straddle the peripheral flanges of the pipes, said first and second pivot pins having their centers spaced from said first ends of said retainers, respectively, by a first distance which is greater than a second distance measured between said first ends of said retainers at their inner circumferential edges so that said first ends form a pair of lever arms; and a latch pivotally coupled to said second end of said first retainer by a third pivot pin and releasably coupled to said second end of said second retainer by a lug surface.

2. A pipe coupling device according to claim 1, wherein said hinge further includes a plurality of said first links and a plurality of said second links with said plurality of first and second links simultaneously engaging said first and second pins to simultaneously carry a portion of a coupling load applied to the peripheral flanges of the pipes by said coupling device.

3. A pipe coupling device according to claim 1, wherein said third pivot pin and said lug surface are spaced from said second ends of said retainers, respectively, by distances which are greater than the space between said second ends of said retainers to form a pair of lever arms.

4. A pipe coupling device according to claim 1, wherein said latch includes a tension bolt pivotally coupled at one end to said second end of said first retainer and a nut threadedly coupled to the other end of said tension bolt for engaging a lug on said second retainer adjacent said second end of said second retainer.

5. A pipe coupling device according to claim 4, wherein said latch further includes safety means for retaining said retainers around the pipes upon failure of said bolt.

6. A pipe coupling device according to claim 4, wherein said lug on said second retainer is formed by a pair of gusset plates having rear edges extending tangentially to said second retainer and away from said second end of said second retainer.

7. A pipe coupling device according to claim 1, wherein each of said retainers is a one-piece, unitary member and each of said grooves extends approximately 180°.

8. A pipe coupling device according to claim 1, wherein said first ends of said retainers are spaced apart by said links by a first distance, and said second ends of said retainers are spaced apart by a second distance which is substantially equal to said first distance upon proper coupling of said pipe coupling device about the peripheral flanges of the pipes.

9. A pipe coupling device according to claim 1, wherein said third pivot pin is spaced from said second end of said first retainer by a first distance which is greater than a second distance between said second ends of said retainers.

10. A pipe coupling device according to claim 1, wherein said first retainer has a pair of gusset plates with each of said gusset plates having a pivot hole therein for receiving said third pivot pin.

11. A pipe coupling device according to claim 1, wherein said retainers form a circumferential loading line with the peripheral flanges of the pipes at areas of greatest concentration of forces therebetween, and
said links being positioned so that said line of force extending between said pivot pins is close to said circumferential loading line.

12. A pipe coupling device for releasably coupling a pair of pipes with peripheral end flanges together, comprising:
a first arcuate retainer having a first end, a second end, and a groove with an inner gripping surface extending between said first and second ends for receiving a first portion of each of the peripheral end flanges of the pipes therein;
a second arcuate retainer having a first end, a second end, and a groove with an inner gripping surface extending between said first and second ends of said second arcuate retainer for receiving a second portion of each of the peripheral end flanges of the pipes therein, said first and second retainers forming a circumferential loading line with the peripheral flanges of the pipes at its areas of greatest concentration of forces therebetween;
a hinge including a plurality of first links and a plurality of second links with each of said first and second links being pivotally coupled to said retainers adjacent said first ends of said retainers by first and second pivot pins, respectively, each of said first and second links simultaneously engaging said first and second pins to simultaneously carry a portion of a coupling load applied to the peripheral flanges of the pipes by said coupling device, said first and second links having a line of force extending between said centers of said pins, and said first links being positioned on one side of the peripheral flanges of the pipes and said second links being positioned on the other side of the peripheral flanges of the pipes to straddle the peripheral flanges of the pipes, said first and second links being positioned close to said circumferential loading line; and
a latch pivotally coupled to said second end of said first retainer by a third pivot pin and releasably coupled to said second end of said second retainer by a tension bolt with a nut threadedly coupled thereon.

13. A pipe coupling device according to claim 12, wherein said first and second pivot pins are spaced from said first ends of said retainers, respectively, by a first distance greater than a second distance between said first ends of said retainers to form a pair of lever arms.

14. A pipe coupling device according to claim 13, wherein said third pivot pin and said lug surface are spaced from said second ends of said retainers, respectively, by distances which are greater than the space between said second ends of said retainers to form a pair of lever arms.

15. A pipe coupling device according to claim 14, wherein said lug on said second retainer is formed by a pair of gusset plates having rear edges extending tangentially to said second retainer and away from said second end of said second retainer.

16. A pipe coupling device according to claim 15, wherein said first ends of said retainers are spaced apart by said links by a first distance, and said second ends of said retainers are spaced apart by a second distance which is substantially equal to said first distance upon proper coupling of said pipe coupling device about the peripheral flanges of the pipes.

17. A pipe coupling device for releasably coupling a pair of pipes with peripheral end flanges together, comprising:
a one-piece first arcuate retainer having a first end with a first pivot point adjacent thereto, a second end with a recessed retaining surface adjacent thereto, and a groove with an inner gripping surface extending between said first and second ends for receiving a first portion of each of the peripheral end flanges of the pipes therein;
a second one-piece arcuate retainer having a first end with a second pivot point adjacent thereto, a second end with a third pivot point adjacent thereto, and a groove with an inner gripping surface extending between said first and second ends of said second arcuate retainer for receiving a second portion of each of the peripheral end flanges of the pipes therein;
a hinge pivotally coupling said first ends of said first and second retainers; and
a latch having a tension bolt with one end pivotally coupled to said third pivot point at said second end of said second retainer by a pair of gusset plates and a nut threadedly coupled on the other end of the tension bolt for releasably engaging said recessed retaining surface at said second end of said first retainer, said latch having a coupling load line of force extending along its axis between said third pivot point and a contact point on said recessed retaining surface for pulling said second ends of said retainer together, said coupling load line of said latch being canted to extend substantially parallel to a tangent line extending through a point on said second end of said first retainer and non-tangently diverging from said second end of said second retainer, said latch engaging said contact point of said retaining surface at said coupling load line of force to apply an outwardly extending resultant pulling force on said second end of said first retainer away from the peripheral flanges of the pipes, and said latch pulling said second end of said second retainer at said third pivot point to apply an inwardly extending resultant pulling force on said second end of said second retainer inwardly towards the peripheral flanges of the pipes.

18. A pipe coupling device of claim 17, wherein said hinge has a single pivot point interconnecting said first ends of said first and second retainers such that said first and second pivot points are aligned.

19. A pipe coupling device of claim 18, wherein said hinge is a clevis hinge with a first pivot hole formed in said first retainer at said first pivot point, a second pivot hole formed in said second retainer at said second pivot point, and a pivot pin extending through said first and second pivot holes.

20. A pipe coupling device of claim 17, wherein said latch includes a tension bolt with a nut threaded thereon, said tension bolt being pivotally coupled to said second retainer at said third pivot point, and said nut operatively engaging said retaining surface on said first retainer.

21. A pipe coupling device of claim 20, wherein said nut includes a curved surface, and said retaining surface is a complementarily shaped curved surface for engaging said curved surface of said nut.

22. A pipe coupling device of claim 17, wherein said first retainer encompasses less of the pipes than said second retainer.

23. A pipe coupling device of claim 22, wherein said second retainer extends through an arc concentric with the pipes, which is more than approximately 180°.

24. A pipe coupling device of claim 17, wherein said retaining surface being spaced from said second end to form a lever arm which is sized for counteracting the moment force transmitted to said retaining surface by said latch to substantially eliminate distortion of the pipes by said second end of said first retainer.

25. A pipe coupling device of claim 24, wherein said latch includes a tension bolt with a nut threaded thereon, said tension bolt being pivotally coupled to said second retainer at said third pivot point, and said nut operatively engaging said retaining surface on said first retainer.

26. A pipe coupling device of claim 25, wherein said second retainer extends through an arc concentric with the pipes, which is more than approximately 180°.

27. A pipe coupling device of claim 26, wherein said hinge is a clevis hinge with a first pivot hole formed in said first retainer at said first pivot point, a second pivot hole formed in said second retainer at said second pivot point, and a pivot pin extending through said first and second pivot holes.

28. A pipe coupling device of claim 17, wherein said retaining surface is positioned approximately 15° to 20° from a center line passing through the center of the pipes and midway between said second ends of said first and second retainers.

* * * * *